United States Patent
Park et al.

(10) Patent No.: US 10,015,726 B2
(45) Date of Patent: **\*Jul. 3, 2018**

(54) METHOD AND APPARATUS FOR ACTIVE SCANNING IN WIRELESS LAN

(71) Applicant: LG Electronics Inc., Seoul (KR)

(72) Inventors: Giwon Park, Seoul (KR); Hangyu Cho, Seoul (KR); Kiseon Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/266,872

(22) Filed: Sep. 15, 2016

(65) Prior Publication Data

US 2017/0006527 A1    Jan. 5, 2017

Related U.S. Application Data

(63) Continuation of application No. 14/443,124, filed as application No. PCT/KR2014/003767 on Apr. 29, 2014, now Pat. No. 9,451,538.

(60) Provisional application No. 61/819,654, filed on May 6, 2013, provisional application No. 61/821,200, filed on May 8, 2013.

(51) Int. Cl.
| | |
|---|---|
| *H04W 48/14* | (2009.01) |
| *H04W 48/16* | (2009.01) |
| *H04W 8/22* | (2009.01) |
| *H04W 48/10* | (2009.01) |
| *H04W 84/12* | (2009.01) |

(52) U.S. Cl.
CPC ............ *H04W 48/14* (2013.01); *H04W 8/22* (2013.01); *H04W 48/10* (2013.01); *H04W 48/16* (2013.01); *H04W 84/12* (2013.01)

(58) Field of Classification Search
CPC .................................................. H04W 48/14
See application file for complete search history.

(56) References Cited

U.S. PATENT DOCUMENTS

| | | |
|---|---|---|
| 2002/0042259 A1 | 4/2002 | Goia |
| 2010/0120365 A1 | 5/2010 | Sim et al. |

(Continued)

FOREIGN PATENT DOCUMENTS

| | | |
|---|---|---|
| EP | 2861031 A1 | 4/2015 |
| WO | 2005/006785 A2 | 1/2005 |
| WO | 2013/063594 A1 | 5/2013 |

OTHER PUBLICATIONS

Kneckt, et al.: "Active Scanning Enabling FILS", IEEE 802.11-11/1619r3, XP068038006, IEEE P802.11 Wireless LANs, Jan. 19, 2012.

(Continued)

*Primary Examiner* — Michael T Vu
(74) *Attorney, Agent, or Firm* — Dentons US LLP

(57) ABSTRACT

Disclosed are a method and an apparatus for active scanning in a wireless LAN. The method for active scanning in a wireless LAN may comprise the steps of: a first station (STA) transmitting a first probe request frame to an access point (AP); and a first STA receiving a probe response frame from the AP, wherein the probe response frame is a response for the probe request frame, and the first probe request frame comprises fast initial link setup (FILS) capability information which can indicate whether the first STA supports FILS.

6 Claims, 16 Drawing Sheets

(56) References Cited

U.S. PATENT DOCUMENTS

| | | |
|---|---|---|
| 2010/0155350 A1 | 6/2010 | Kaplan |
| 2013/0177002 A1 | 7/2013 | Sun et al. |
| 2013/0247150 A1* | 9/2013 | Cherian .............. H04L 63/0815 726/4 |
| 2013/0301607 A1* | 11/2013 | McCann ........... H04W 36/0072 370/331 |
| 2014/0148099 A1* | 5/2014 | Reunamaki ....... H04W 52/0209 455/41.2 |

OTHER PUBLICATIONS

Abraham, et al.: "Text for access delay reduction for FILS", IEEE 802.11-12/0124r1, XP068038236, IEEE P802.11 Wireless LANs, Jan. 9, 2012.

Kim, et al.: "Proposed 802.11TGai Specification Text for enhanced active scanning procedure for FILS", IEEE 802.11-12/1114r6, XP068039847, IEEE P802.11 Wireless LANs, Nov. 13, 2012.

Li, et al.: "AP discovery with FILS beacon", IEEE 802.11-12/0042r0, XP055138181, IEEE P802.11 Wireless LANs, Jan. 8, 2012.

Chu, et al.: "Active Scan Optimization", IEEE 802.11-12/1263r0, Nov. 1, 2012, pp. 1-9.

Fanh, et al.: "Specification Framework for TGai", EEE 802.11-12/0151r14, Nov. 14, 2012, pp. 1-13.

"Specification Framework for TGai", IEEE P802.11-12/0151r7, Wireless LANs, T. Siep, CSR, Jan. 2011.

"FILS Authentication Protocol", IEEE 802.11-12/1045r6, D. Harkins, Aruba Networks, Oct. 2012.

* cited by examiner

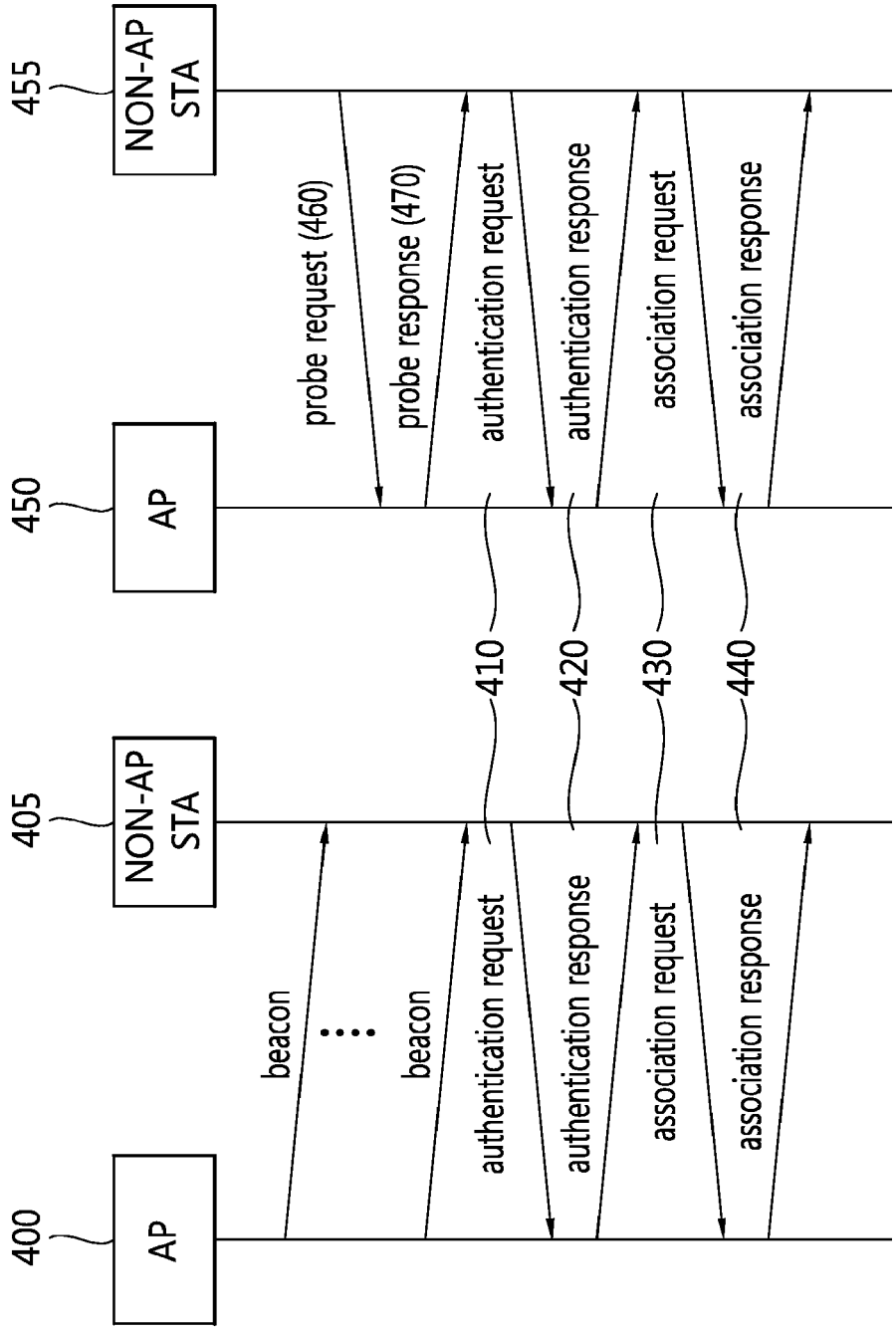
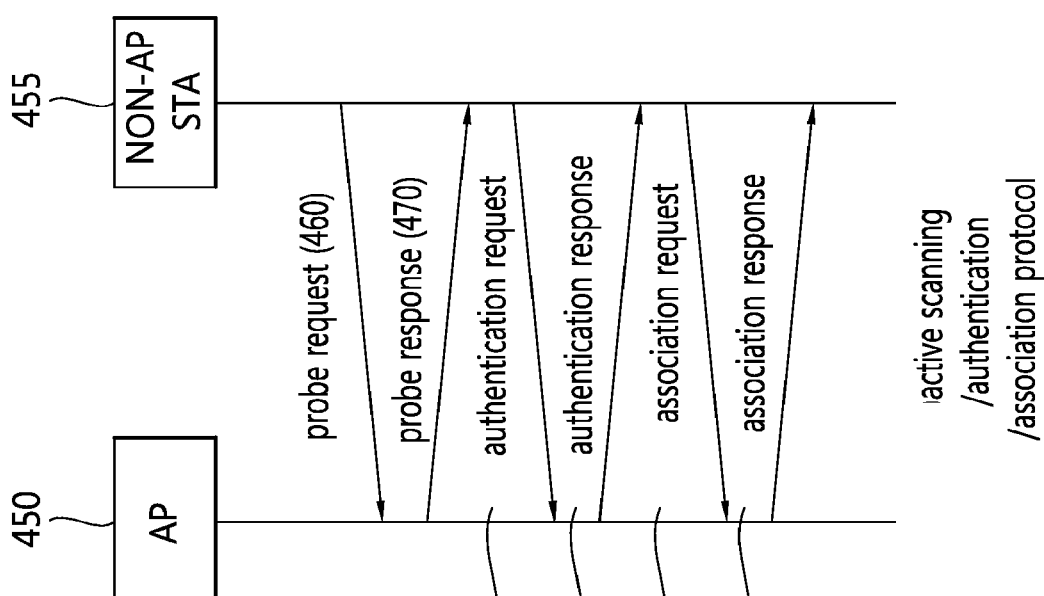
FIG. 4(A)
FIG. 4(B)

probe request frame (610)
(wildcard, SSID, wildcard BSSID)

probe request frame(630)
(SSID, BSSID)

probe request frame (660)
(SSID, wildcard BSSID)

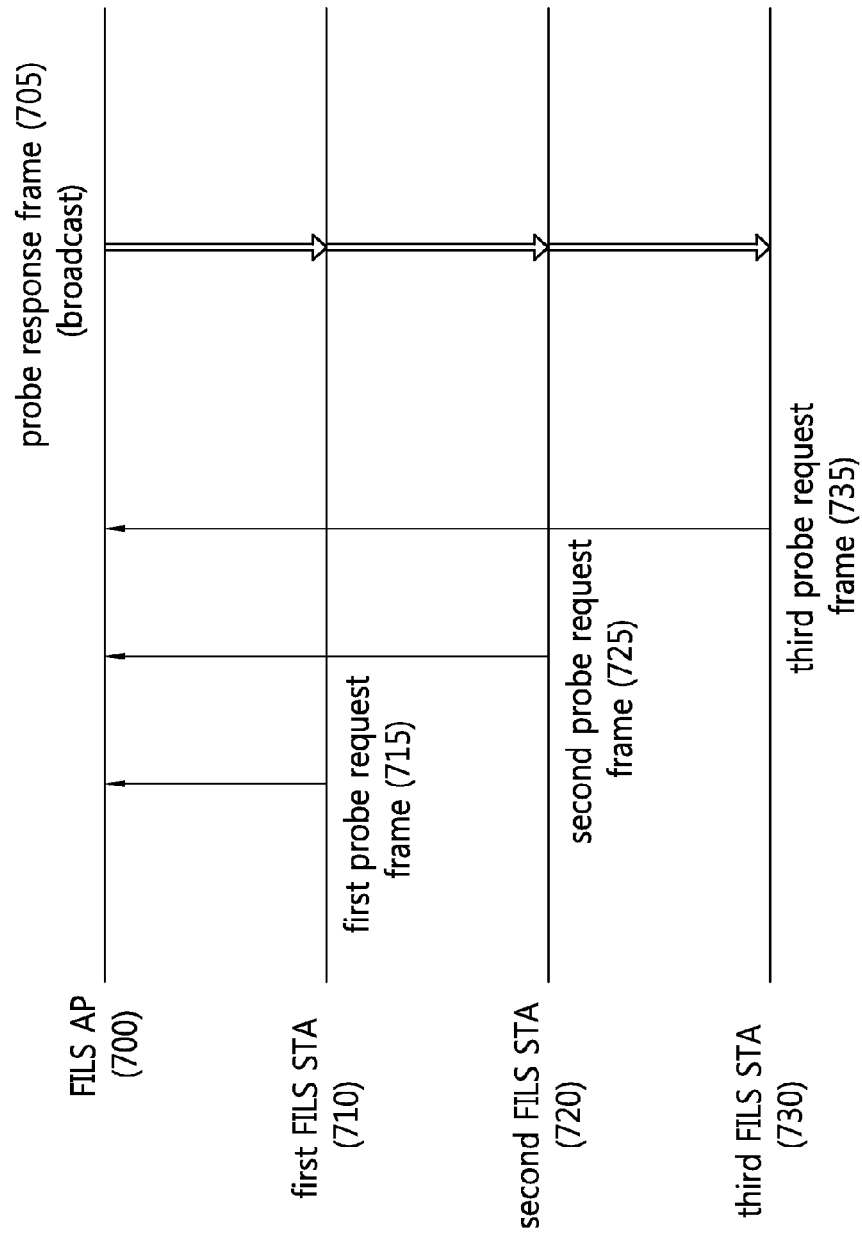

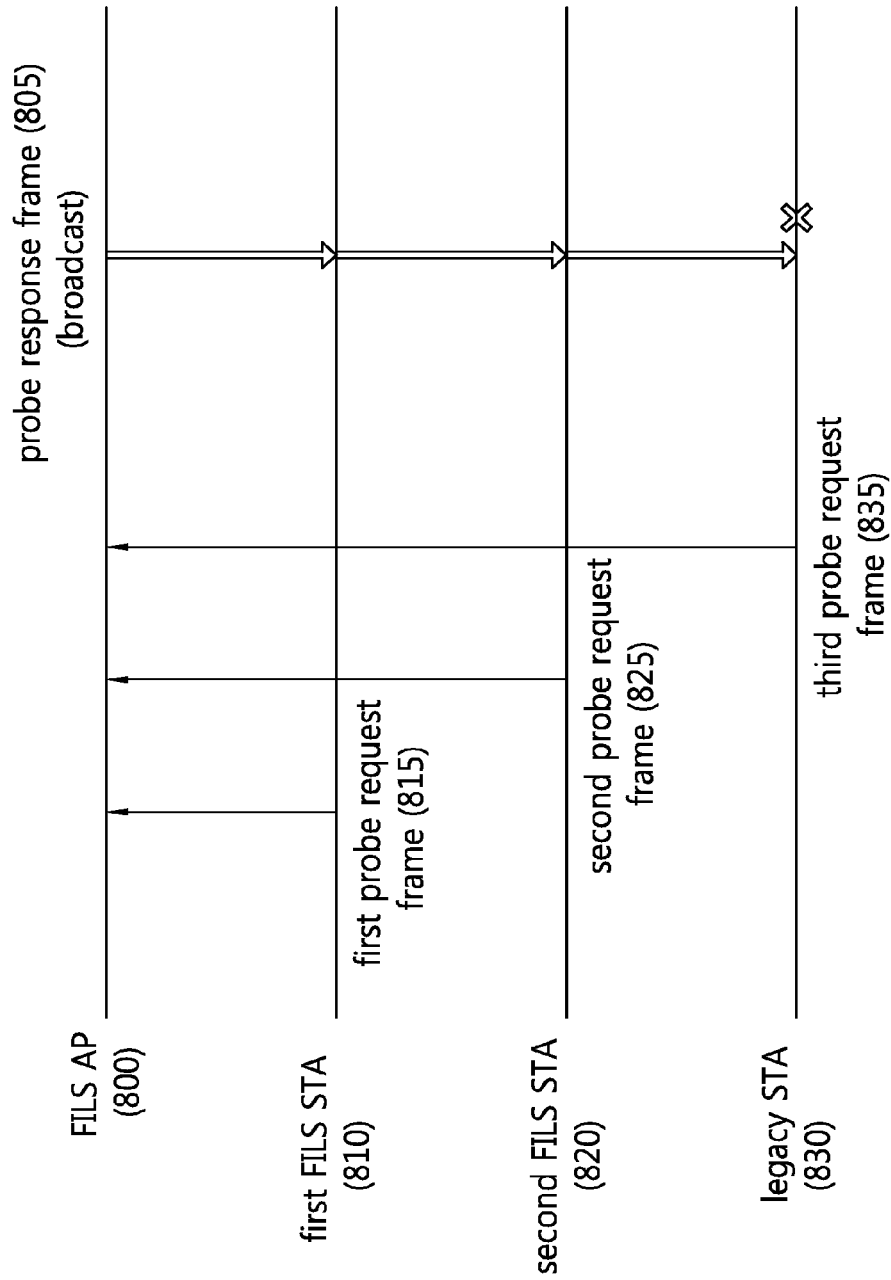

METHOD AND APPARATUS FOR ACTIVE SCANNING IN WIRELESS LAN

This application is a continuation of U.S. patent application Ser. No. 14/443,124, filed May 15, 2015, now allowed, which is a 35 USC § 371 National Stage entry of International Application No. PCT/KR2014/003767 filed on Apr. 29, 2014, and claims priority to U.S. Provisional Application Nos. 61/819,654 filed on May 6, 2013 and 61/821,200 filed on May 8, 2013, all of which are hereby incorporated by reference in their entireties as if fully set forth herein.

BACKGROUND OF THE INVENTION

Field of the Invention

The present invention relates to a method and apparatus for performing active scanning in a wireless local area network (WLAN), and more particularly, to a method and apparatus for performing a fast initial link setup (FILS).

Related Art

A wireless local area network (WLAN) technique has recently been evolved roughly in three directions. An effort for further increasing a transfer rate is made as an extension of the evolution of the legacy WLAN, and examples thereof include institute of electrical and electronic engineers (IEEE) 802.11ac and IEEE 802.11ad. The IEEE 802.11ad is a WLAN technique which uses a 60 GHz band. In addition, a broadband WLNA which utilizes a frequency band less than 1 GHz is recently emerged to enable broader band transmission in comparison with the legacy WLAN, and examples thereof include IEEE 802.11af which utilizes a TV white space (TVWS) band and IEEE 802.11ah which utilizes a 900 MHz band. These techniques are primarily aiming at not only a smart grid and a broadband sensor network, but also an extension of an extended range Wi-Fi service. In addition, the legacy WLAN medium access control (MAC) technique has a problem in that an initial link setup time becomes significantly long in some cases. In order to solve such a problem, an IEEE 802.11ai standardization action is actively carried out recently to allow a station (STA) to be able to rapidly access an access point (AP).

The IEEE 802.11ai is a MAC technique which deals with a fast authentication procedure to remarkably reduce an initial set-up and association time of the WLAN, and a standardization action was formally started as a task group on January, 2011. To enable a fast access procedure, there is ongoing discussion carried out in the IEEE 802.11ai for procedure simplification in an area of AP discovery, network discovery, time synchronization function (TSF) synchronization, authentication & association, procedure combination with a higher layer, etc. Among them, there is ongoing discussion actively carried out for ideas such as procedure combination which utilizes piggyback of dynamic host configuration protocol (DHCP), optimization of full extensible authentication protocol (EAP) which uses concurrent IP, effective selective access point (AP) scanning, etc.

SUMMARY OF THE INVENTION

The present invention provides a method of performing active scanning in a wireless local area network (WLAN). The present invention also provides an apparatus for performing active scanning in a WLAN.

According to one aspect of the present invention, a method of performing active scanning in a wireless local area network (WLAN) is provided. The method includes: transmitting by a first station (STA) a first probe request frame to an access point (AP); and receiving by the first STA a probe response frame from the AP, wherein the probe response frame is a response for the first probe request frame, wherein the first probe request frame includes fast initial link setup (FILS) capability information, and wherein the FILS capability information indicates whether the first STA supports an FILS.

According to another aspect of the present invention, an STA for performing active scanning in a WLAN is provided. The STA includes: a radio frequency (RF) unit implemented to transmit a radio signal; and a processor selectively coupled to the RF unit, wherein the processor is implemented to transmit a first probe request frame to an AP and to receive a probe response frame from the AP in response to the first probe request frame, wherein the first probe request frame includes FILS capability information, and wherein the FILS capability information indicates whether the first STA supports an FILS.

Since information regarding whether a station (STA) supports a fast initial link setup (FILS) is transmitted to an FILS access point (AP), the FILS AP can determine a method of transmitting a probe response frame. Therefore, an FILS STA supporting the FILS can rapidly perform an initial link setup procedure with respect to the FILS AP.

BRIEF DESCRIPTION OF THE DRAWINGS

FIGS. 4(A) and 4(B) show the concept of an authentication procedure and association procedure performed after a scanning procedure of an access point (AP) and a station (STA).

FIG. 7 shows the concept of an initial link setup procedure according to an embodiment of the present invention.

FIG. 8 shows the concept of an initial link setup procedure according to an embodiment of the present invention.

DESCRIPTION OF EXEMPLARY
EMBODIMENTS

Figure 1A:
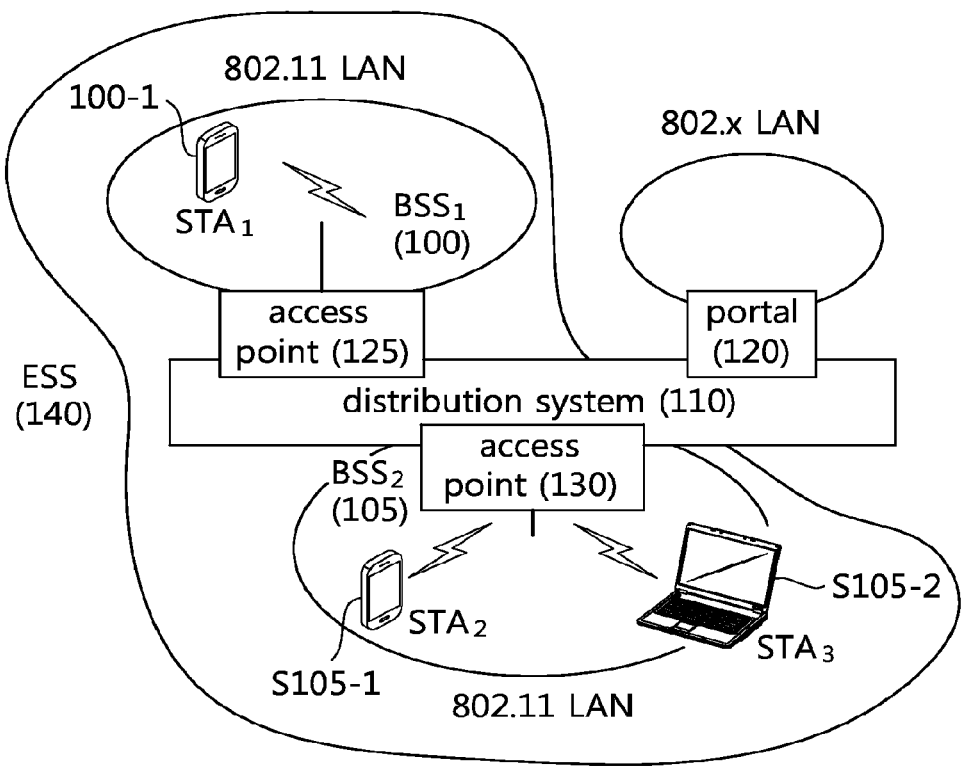
FIGS. 1(A) and 1(B) show the concept of a structure of a wireless local area network (WLAN).
Figure 1B:
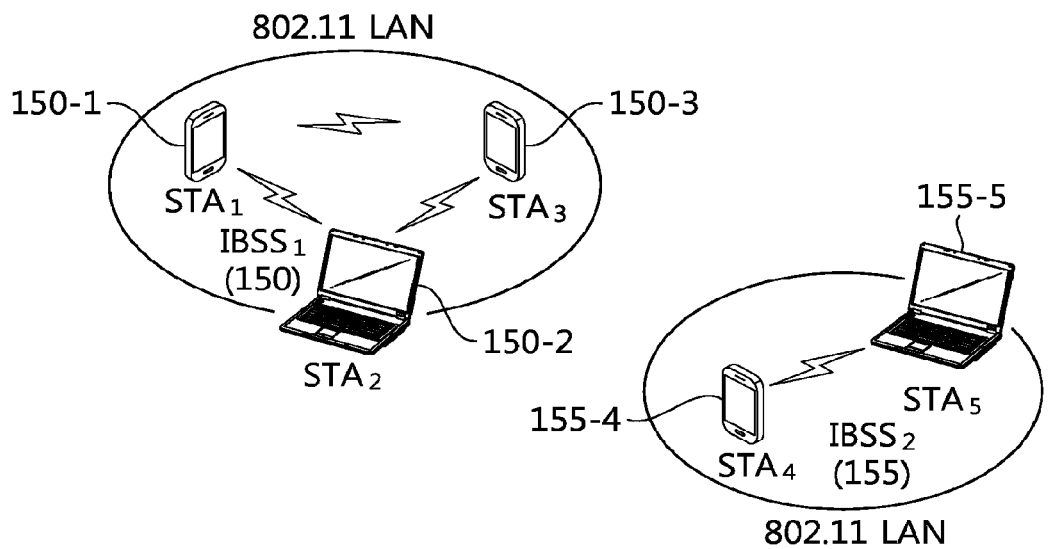

FIG. 1 is a concept view illustrating the structure of a wireless local area network (WLAN).

An upper part of FIG. 1(A) shows the structure of the IEEE (institute of electrical and electronic engineers) 802.11 infrastructure network.

Referring to the upper part of FIG. 1(A), the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
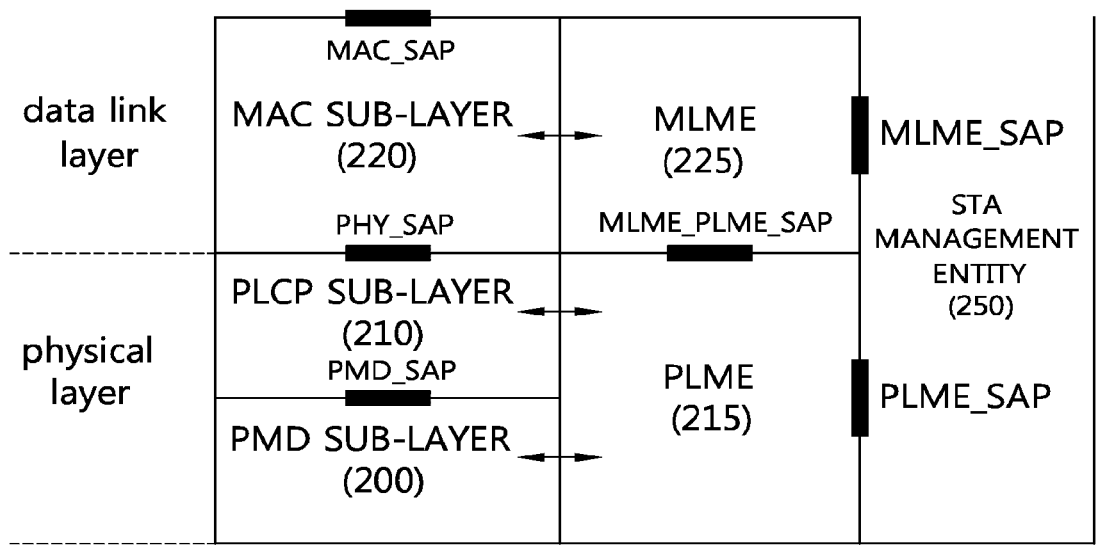
FIG. 2 shows a layer architecture of a WLAN system supported by institute of electrical and electronic engineers (IEEE) 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3B:
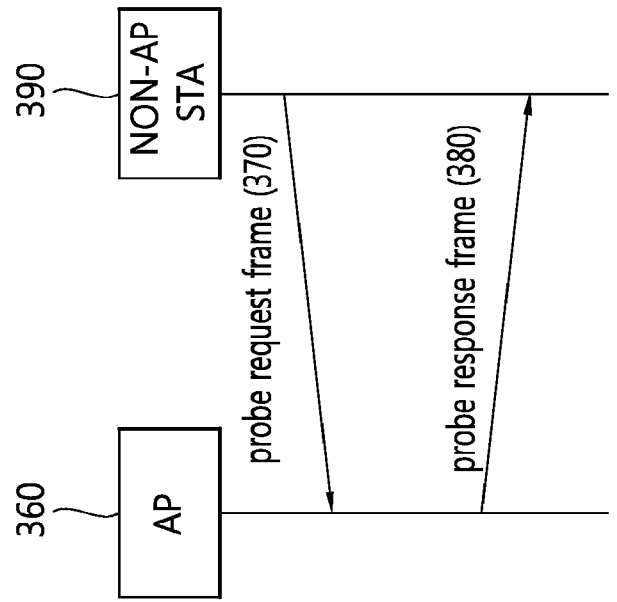
FIGS. 3(A) and 3(B) show the concept of a scanning method in a WLAN.
Figure 3A:
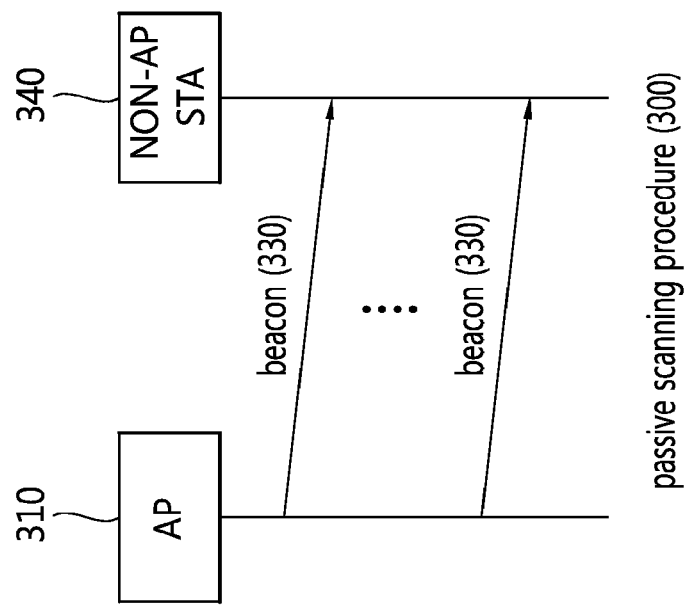

FIG. 3 is a concept view illustrating a scanning method in a WLAN.

Referring to FIG. 3, the scanning method may be divided into passive scanning 300 and active scanning 350.

Referring to a left part of FIG. 3, the passive scanning 300 may be performed by a beacon frame 330 that is periodically broadcast from the AP 310. The AP 310 in the WLAN broadcasts the beacon frame 330 to the non-AP STA 340 at a particular period (e.g., per 100 msec). The beacon frame 330 may contain information on the current network. The non-AP STA 340 may perform scanning on the channel with the AP 310 to perform the authentication/association process by obtaining the network information from the beacon frame 330 periodically broadcast.

The passive scanning method 300 only receives the beacon frame 330 transmitted from the AP 310 without the need for the non-AP STA 340 to transmit a frame. Accordingly, the passive scanning 300 is advantageous of a reduction in the overall overhead that is created upon data transmission/reception over the network. However, since the scanning is obliged to be passively performed in proportion to the period of the beacon frame 330, the time taken to perform scanning may be increased. The details of the beacon frame are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, IEEE 802.11)' 8.3.3.2 beacon frame disclosed on November, 2011. IEEE 802.11ai may additionally use other format of a beacon frame, and such beacon frame may be referred to as a FILS (fast initial link setup) beacon frame. Further, the measurement pilot frame is a frame containing only some information of the beacon frame, and the measurement pilot frame may be used in the scanning procedure. The measurement pilot frame is set forth in IEEE 802.11 8.5.8.3 measurement pilot format.

Also, a fast initial link setup (FILS) discovery frame may be defined. The FILS discovery frame is a frame transmitted between each of the transmission periods in each AP, may be a frame transmitted with a shorter period than the beacon frame. That is, the FILS discovery frame is a frame transmitted with a shorter period than a transmission period of the beacon frame. The FILS discovery frame may include identification information (SSID, BSSID) of an AP that transmits the FILS discovery frame. It may be implemented that the FILS discovery frame is transmitted to an STA before the beacon frame is transmitted, and thus, the STA may search that an AP is existed in the corresponding channel beforehand. An interval of which the FILS discovery frame is transmitted in one AP is referred to as an FILS discovery frame transmission interval. The FILS discovery frame may be transmitted with a part of information included in the beacon frame being included. The FILS discovery frame may also include information for a transmission time of the beacon frame of neighbor AP.

Referring to a right part of FIG. 3, the active scanning 350 refers to a method in which the non-AP STA 390 leads scanning by transmitting a probe request frame 370 to the AP 360.

After receiving the probe request frame 370 from the non-AP STA 390, the AP 360 may wait a random time to prevent frame collision, and the AP 360 then includes network information in a frame response frame 380, then sending the same to the non-AP STA 390. The non-AP STA 390 may obtain the network information based on the received probe response frame 380 to stop the scanning process.

The active scanning 350 allows the non-AP STA 390 to lead the scanning process, and the active scanning 350 has the advantage of a short scanning time. However, the non-AP STA 390 should transmit the probe request frame 37, resulting in an increase in the network overhead for frame transmission and reception. The probe request frame 370 is set forth in IEEE 802.11 Ch. 8.3.3.9, and the probe response frame 380 is set forth in IEEE 802.11 Ch. 8.3.3.10.

After the scanning is done, the AP and the STA may conduct an authentication and association procedure.

FIG. 4 is a concept view illustrating an authentication and association process after scanning between an AP and an STA.

Referring to FIG. 4, after passive/active scanning, the authentication and association may be conducted with one of the scanned APs.

The authentication and association process may be carried out by way of, e.g., 2-way handshaking. A left part of FIG. 4 is a concept view illustrating an authentication and association process after passive scanning, and a right part of FIG. 4 is a concept view illustrating an authentication and association after active scanning.

The authentication and association process may be equally performed by exchanging an authentication request frame 410/authentication response frame 420 and an association request frame 430/association response frame 440 between the AP 400 or 450 and the non-AP STA 405 or 455 regardless of which one of the active scanning method and the passive scanning method has been used.

The authentication process may be conducted by transmitting the authentication request frame 410 from the non-AP STA 405 or 455 to the AP 400 or 450. In response to the authentication request frame 410, the authentication response frame 420 may be transmitted from the AP 400 or 450 to the non-AP STA 405 or 455. The authentication frame format is set forth in IEEE 802.11 Ch. 8.3.3.11.

The association process may be conducted by transmitting the association request frame 430 from the non-AP STA 405 or 455 to the AP 400 or 405. In response to the association request frame 430, the association response frame 440 may be transmitted from the AP 400 or 450 to the non-AP STA 405 or 455. The transmitted association request frame 430 contains information on the capability of the non-AP STA 405 or 455. Based on the information on the capability of the non-AP STA 405 or 455, the AP 400 or 450 may determine whether the non-AP STA 405 or 455 may be supported. In case such support is possible, the AP 400 or 450 may include in the association response frame 440 whether to accept the association request frame 430 and a reason therefore, and its supportable capability information, and the AP 400 or 450 may send the same to the non-AP STA 405 or 455. The association frame format is set forth in IEEE 802.11 Chs. 8.3.3.5/8.3.3.6.

After the association step is done, normal data transmission and reception is carried out. The association, unless done, is re-conducted based on the reason for which the association is not performed, or association with other AP may be performed.

Figure 5:
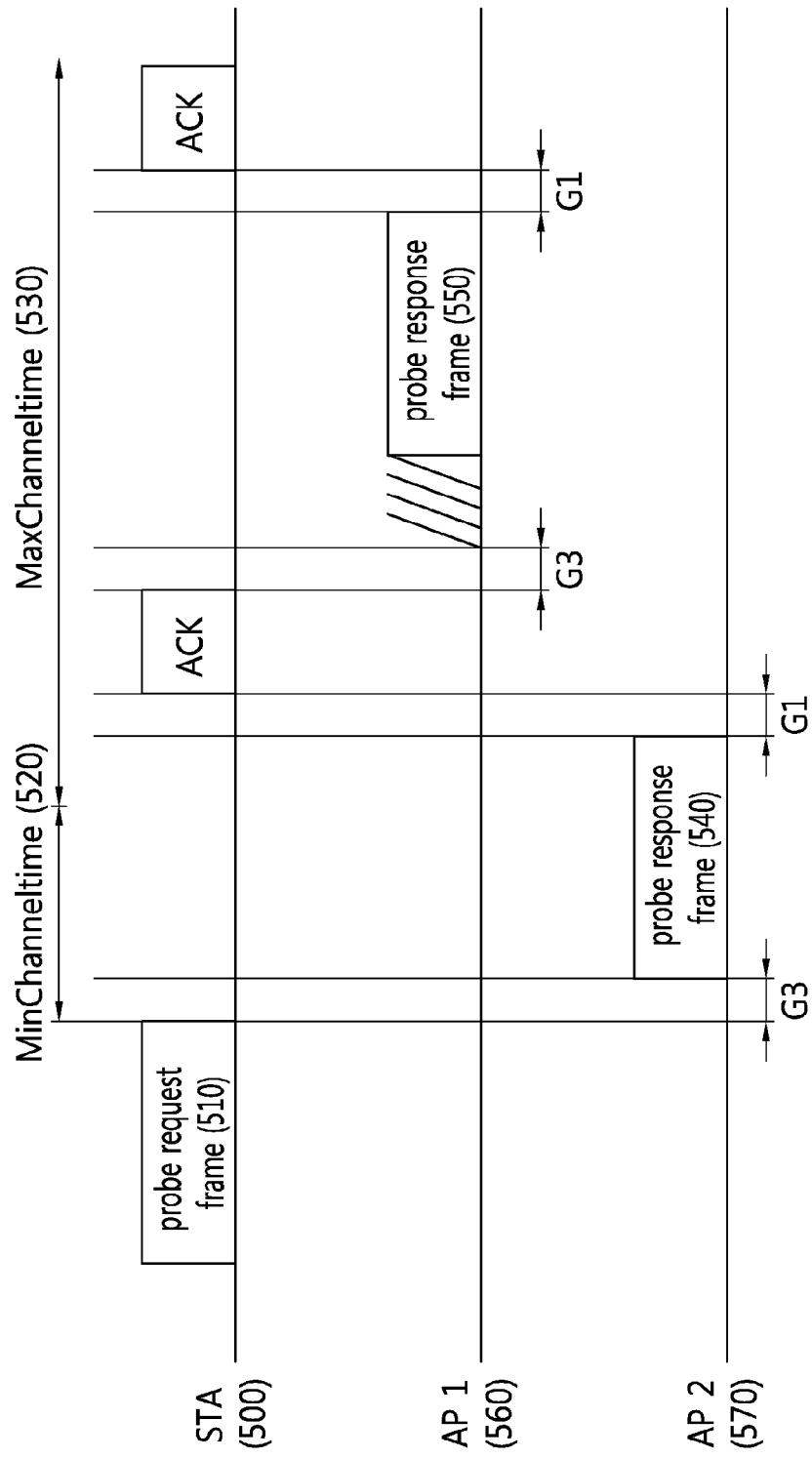
FIG. 5 shows the concept of an active scanning procedure.

FIG. 5 is a concept view illustrating an active scanning procedure.

Referring to FIG. 5, the active scanning procedure may be performed in the following steps.

(1) It is determined whether the STA 500 is ready to perform the scanning procedure.

The STA 500 may wait, e.g., until the probe delay time expires or particular signaling information (for example, PHY-RXSTART.indication primitive) is received to perform active scanning.

The probe delay time is a delay that occurs before the STA 500 sends a probe request frame 510 when performing active scanning. PHY-RXSTART.indication primitive is a signal that is transmitted from the physical (PHY) layer to the local MAC (medium access control) layer. PHY-RXSTART.indication primitive may signal information indicating that the PLCP (physical layer convergence protocol) has received a PPDU (PLCP protocol data unit) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA 500 may transmit the probe request frame 510 to the APs 560 and 570 using a basic access method.

(3) Information for specifying the APs 560 and 570 included in MLME-SCAN.request primitive (for example, SSID (service set identification) and BSSID (basic service set identification) information) may be included in the probe request frame 510 and may be transmitted.

The BSSID may have a value corresponding to the MAC address of the AP as an indicator to specify the AP. The SSID (service set identification) is a network term for specifying an AP, which may be read by a person who operates the STA. The BSSID and/or SSID may be used to specify an AP.

The STA 500 may specify an AP based on the information to specify the APs 560 and 570 included by MLME-SCAN.request primitive. The specified APs 560 and 570 may send the probe response frames 540 and 550 to the STA 500.

The STA 500 may include the SSID and BSSID information in the probe request frame 510 and send the same, thereby unicasting, multicasting, or broadcasting the probe request frame 510. A method of unicasting, multicasting, or broadcasting the probe request frame 510 using the SSID and BSSID information is further described with reference to FIG. 5. For example, in case an SSID list is included in MLME-SCAN.request primitive, the STA 500 may include the SSID list in the probe request frame 510 and transmit the same. The APs 560 and 570 may receive the probe request frame 510, determine the SSIDs included in the SSID list contained in the received probe request frame 510, and determine whether to send the probe response frames 540 and 550 to the STA 500.

(4) A probe timer is initialized as 0 and is then operated.

The probe timer may be used to check a minimum channel time (MinChanneltime, 520) and a maximum channel time (MaxChanneltime, 530). The minimum channel time 520 and the maximum channel time 530 may be used to control the active scanning operation of the STA 500.

The minimum channel time 520 may be used to perform the operation for varying the channel for conducting active scanning. For example, in case the STA 500 fails to receive the probe response frames 540 and 550 until the minimum channel time 520, the STA 500 shifts scanning channels to perform scanning on other channel. In case the STA 500 receives the probe response frame 550 until the minimum channel time 520, it may process the received probe response frames 540 and 550 after waiting until the maximum channel time 530.

The STA 500 may detect PHY-CCA.indication primitive until the probe timer reaches the minimum channel time 520 and may determine whether other frame (for example, probe response frames 540 and 550) has been received by the STA 500 until before the minimum channel time 520.

PHY-CCA.indication primitive may transmit information on the state of the medium from the physical layer to the MAC layer. PHY-CCA.indication primitive may indicate the current state of the channel using channel state parameters such as "busy" when the channel is unavailable and "idle" when the channel is available. The STA 500 may determine that there are probe response frames 540 and 550 received by the STA 500 when PHY-CCA.indication is detected to be busy and may determine that there are no probe response frames 540 and 550 received by the STA 500 when PHY-CCA.indication is detected to be idle.

In case PHY-CCA.indication is detected to be idle, the STA 500 may set an NAV (net allocation vector) to 0, and the STA 500 may scan a next channel. In case PHY-CCA.indication is detected to be busy, the STA 500 may perform a process on the received probe response frames 540 and 550 after the probe timer reaches the maximum channel time 530. After the process on the received probe response frames 540 and 550 is done, the STA 500 may set the NAV (net allocation vector) to 0 and may then scan a next channel.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA 500 uses the active scanning method, the STA 500 should perform monitoring to determine whether the parameter of PHY-CCA.indication is busy until the probe timer reaches the minimum channel time.

The specific information included in the above-described MLME-SCAN is as follows. In order for the STA to perform scanning, the MLME may receive MLME-SCAN.request primitive. MLME-SCAN.request primitive is a primitive created by the SME. MLME-SCAN.request primitive may be used to determine whether there is other BSS to which the STA is to be connected.

MLME-SCAN.request primitive may contain information specifically such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo. The details of MLME-SCAN.request primitive are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications' 6.3.3.2 MLME-SCAN.request disclosed on November, 2011.

The following Table 1 briefly represents example information included in MLME-SCAN.request primitive.

TABLE 1

| name | description |
| --- | --- |
| BSSType | Determines whether infrastructure BSS, IBSS, MBSS (Mesh basic service set), or all, are included in the scan |
| BSSID | Identifies a specific or wildcard BSSID |
| SSID | Specifies the desired SSID or the wildcard SSID |
| ScanType | Indicates either active or passive scanning |
| ProbeDelay | Delay(in microseconds) to be used prior to transmitting a probe frame during active scanning |
| ChannelList | Specifies a list of channels that are examined when scanning for a BSS |
| MinChannelTime | The minimum time(in TU) to spend on each channel when scanning |
| MaxChannelTime | The maximum tine(in TU) to spend on each channel when scanning |
| RequirementInformation | This element is optionally present if dot11RadioMeasurementActivated is true and is placed in a Probe Request frame to request that the responding STA include the requested information in the Probe Response frame |
| SSID List | One or more SSID elements that are optionally present when dot11MgmtOptionSSIDListActivated is true |
| ChannelUsage | Specific request types for the ChannelUsage request |
| AccessNetworkType | Specifies a desired specific access network type or the wildcard access network type |
| HESSID | Specifies the desired specific HESSID network identifier or the wildcard network identifier. This field is present when dot11InterworkingSeviceActivated is true |
| Mesh ID | Only present if BSSType = MESH or BSSType = ANY_BSS. Specifies the desired Mesh ID or wildcard Mesh ID. |
| RequestParameters | The parameters define the responding STAs |
| ReportingOption | Indicates the result reporting mode |
| APConfigurationChangeCount | When a specific BSSID is indicated in the MLME-SCAN.request, the APConfigurationChangeCount associated with the stored configuration of the AP is optionally provided |
| VendorSpecificInfo | Information added according to each of vendors |

The request parameter included in MLME-SCAN.request primitive may be used to determine whether the responding STA is to transmit a probe response frame. The request parameter may contain information for requesting that other BSS's information be included in the probe response frame. Also, the request parameter may include a report request field, a delay reference field, and a maximum delay limit field.

The report request field contains information to request that other BSS's information be included in the probe response frame, the delay reference field contains information on the delay type applied as a response to the probe request frame, and the maximum delay limit field may contain the maximum access delay information on the delay type indicated by the delay reference field.

Besides, the request parameter may include a minimum data rate field and/or a received signal strength limit field. The minimum data rate field contains information on the lowest overall data rate in transmitting an MSDU or A-MSDU. The received signal strength limit field may further contain information on the limit value of the signal necessary for a recipient of the probe request frame to respond.

Figure 6A:
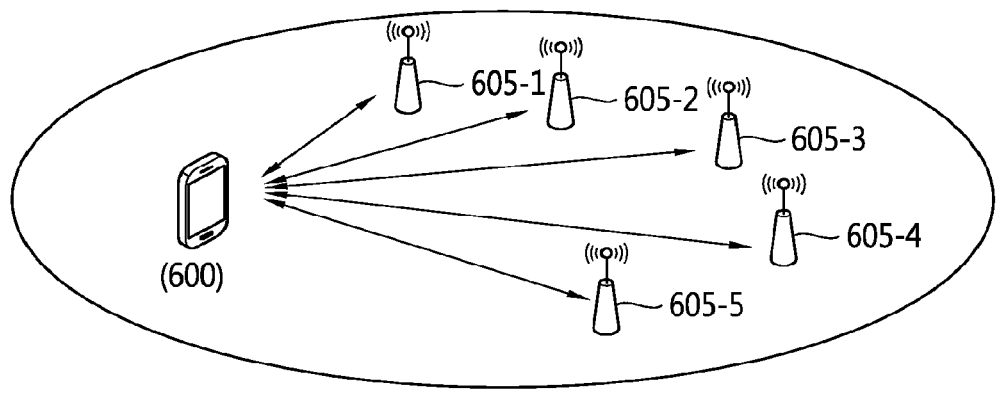
FIGS. 6(A), 6(B) and 6(C) show the concept of a method of transmitting a probe request frame.
Figure 6B:
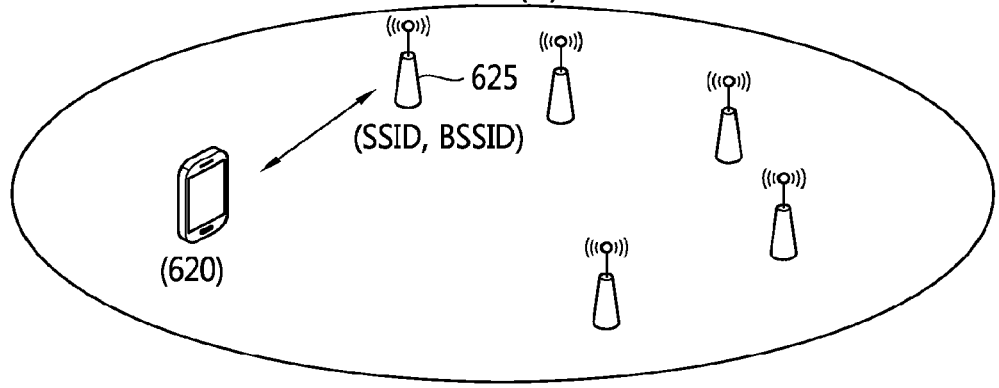
Figure 6C:
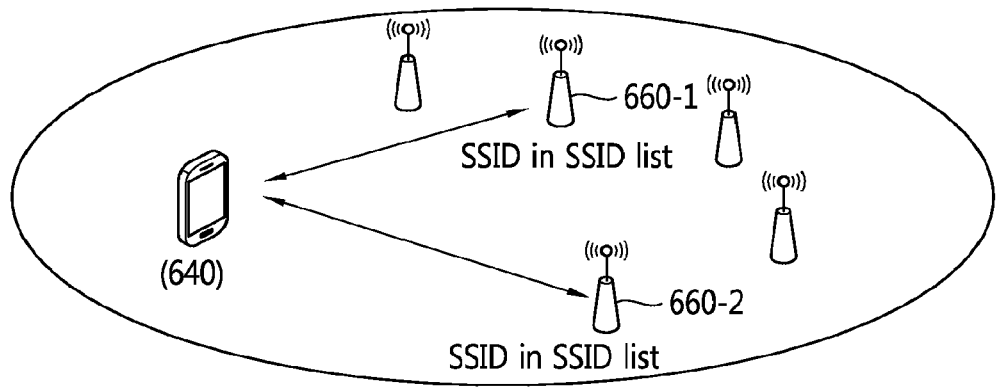

FIG. 6 is a concept view illustrating a probe request frame transmission method.

FIG. 6 discloses methods of broadcasting, multicasting, and unicasting probe request frames from an STA.

An upper part of FIG. 6 shows a method in which the STA 600 broadcasts the probe request frame 610.

The STA 600 may include a wildcard SSID and a wildcard BSSID in the probe request frame 610 and broadcast the probe request frame 610.

The wildcard SSID and the wildcard BSSID may be used as identifiers to indicate all of the APs 605-1, 605-2, 605-3, 605-4, and 605-6 included in the transmission range of the STA 600.

In case the STA 600 transmits the probe request frame 610 with the wildcard SSID and the wildcard BSSID included in the probe request frame 610, the APs 605-1, 605-2, 605-3, 605-4, and 605-6 that have received the probe request frame 610 from the STA 600 may send probe response frames to the STA 600 in response to the received probe request frame.

In case the APs 605-1, 605-2, 605-3, 605-4, and 605-6 that have received the broadcast probe request frame 610 send the probe response frames to the STA 600 in response to the received probe request frame 610 within a predetermined time, the problem may occur that the STA 600 should simultaneously receive and process too many probe response frames.

An middle part of FIG. 6 shows a method in which the STA 620 unicasts the probe request frame 630.

Referring to the middle part of FIG. 6, in case the STA 620 unicasts the probe request frame 630, the STA 620 may transmit the probe request frame 630 containing particular SSID/BSSID information of the AP. Among the APs that receive the probe request frame 630, only the AP 625 corresponding to the SSID/BSSID specified by the STA 620 may transmit a probe response frame to the STA 620.

An lower part of FIG. 6 shows a method in which the STA 640 multicasts the probe request frame 660.

Referring to the lower part of FIG. 6, the STA 640 may include an SSID list and a wildcard BSSID in the probe request frame 660 and transmit the same. Among the APs receiving the probe request frame 660, the APs 660-1 and 660-2 corresponding to the SSIDs included in the SSID list contained in the probe request frame may transmit a probe response frame to the STA 640.

As described above, existing STAs may determine, based on the SSID and BSSID included in the MLME.SCAN-request primitive, whether they unicast, multicast, or broadcast a probe request frame. The probe request frame may be unicast, multicast, or broadcast based on the following settings of the MLME.SCAN-request primitive.

In case the MLME.SCAN request primitive includes a particular BSSID, the STA unicasts a probe request frame to an AP with the particular BSSID. The particular BSSID of the AP may be included in the address field of the MAC header in the unicast probe request frame.

In case the MLME.SCAN request primitive includes an SSID or an SSID list along with a wild card BSSID, the STA may multicast a probe request frame to the AP corresponding to the SSID or SSID list. The SSID or SSID list may be included in the probe request frame, and the BSSID may be included in the address field of the MAC header in the probe request frame.

In case the MLME.SCAN request primitive includes a wild card SSID, the STA may broadcast a probe request frame. The wild card SSID may be included in the probe request frame, and a wild card BSSID may be included in the address field of the MAC header.

If the probe request frame is received from the STA, the AP may transmit a probe response frame in response to the probe request frame. In case of a legacy AP, the probe response frame is unicast in response to the probe request frame. However, if the AP is an FILS AP supporting an FILS, the probe response frame may be broadcast. If the STA and the AP support the FILS, the probe response frame may be broadcast in response to the probe request frame transmitted by the STA.

Hereinafter, in an embodiment of the present invention, an STA supporting the FILS may be referred to as an FILS STA, and an AP supporting the FILS may be referred to as an FILS AP. On the contrary, an STA not supporting the FILS may be referred to as a legacy STA, and an AP not supporting the FILS may be referred to as a legacy AP.

When it is said that the AP or the STA supports the FILS, it may be interpreted in various meanings. Like in the embodiment of the present invention, if the AP broadcasts the probe response frame and the STA is capable of decoding the probe response frame to be broadcast, the AP and the STA may be referred to as the FILS STA and the FILS AP which support the FILS. In addition thereto, an STA and an AP which operate based on the IEEE 802.11ai standard may be referred to as the FILS STA and the FILS AP. Alternatively, an AP which transmits an FILS discovery frame and an STA which receives the FILS discovery frame may be referred to as the FILS AP and the FILS STA. The FILS discovery frame may include AP's next target beacon transmission time (TBTT) offset information. The AP's next TBTT offset information may include information regarding transmission timing of a next beacon frame. The next TBTT offset information may include information regarding a time offset between a discovery frame and a beacon frame to be transmitted next to the discovery frame.

FIG. 7 shows the concept of an initial link setup procedure according to an embodiment of the present invention.

In FIG. 7, it is disclosed an initial link setup procedure between multiple FILS STAs 710, 720, and 730 and an FILS AP 700.

Referring to FIG. 7, the multiple FILS STAs 710, 720, and 730 may transmit multiple probe request frames to the FILS AP 700.

According to the embodiment of the present invention, upon receiving the multiple probe request frames from the FILS STAs 710, 720, and 730, the FILS AP 700 may broadcast a probe response frame. Alternatively, the FILS AP 700 may determine whether to broadcast the probe response frame on the basis of information included in the received multiple probe request frames.

More specifically, it may be assumed that the FILS AP 700 receives multiple probe request frames 715, 725, and 735 from the multiple FILS STAs 710, 720, and 730. The FILS AP 700 may determine whether the same probe response frame can be transmitted on the basis of the multiple probe request frames 715, 725, and 735 received from the multiple FILS STAs 710, 720, and 730. More specifically, if the same information is requested by the probe request frames 715, 725, and 735, the FILS AP 700 may broadcast the same probe response frame 705 to the multiple FILS STAs 710, 720, and 730.

If the FILS AP 700 broadcasts the probe response frame to the multiple FILS STAs 710, 720, and 730, the probe response frame may not be unicast to each of the multiple FILS STAs 710, 720, and 730. Therefore, an FILS may be performed between the FILS AP 700 and the multiple FILS STAs 710, 720, and 730.

If the FILS AP 700 receives the multiple probe request frames 715, 725, and 735 from the multiple FILS STAs 710, 720, and 730, the aforementioned operation may be performed. However, if a probe request frame transmitted by a legacy STA is included in the multiple probe request frames received by the FILS AP 700, the AP may perform a different operation.

FIG. 8 shows the concept of an initial link setup procedure according to an embodiment of the present invention.

In FIG. 8. it is disclosed an initial link setup procedure between at least one of FILS STA 810 and 820, at least one legacy STA 830, and an FILS AP 800.

In a WLAN environment, the FILS AP 800, the legacy STA 830, and the FILS STA 810 or 820 may operate in the same BSS. According to the embodiment of the present invention, the initial access procedure between the STA and the AP may be performed differently on the basis of whether the STA and/or the AP support an FILS.

The FILS AP 800 may receive multiple probe request frames 815, 825, and 835 from multiple STAs (i.e., at least one of FILS STA 810, 820, 830 and at least one legacy STA 830).

It may be assumed a case where the FILS AP 800 broadcasts a probe response frame 805 for the multiple probe request frames 815, 825, and 835. In this case, the FILS STAs 810 and 820 may receive the broadcast probe response frame 805. However, the legacy STA 830 may expect a unicast probe response frame in response to the probe request frame 835. In this case, if the monitored probe response frame 805 is not a unicast frame but a broadcast probe response frame, the legacy STA 830 may not receive the frame. Therefore, the FILS AP 800 does not have to unicast the probe response frame in response to the probe request frame 835 received from the legacy STA 830.

The FILS AP 800 must predetermine whether the STAs 810, 820, and 830 which transmit the probe request frames 815, 825, and 835 are FILS STAs or legacy STAs in order to determine a method of transmitting the probe response frame. If the FILS AP 800 cannot determine whether the STAs 810, 820, and 830 which transmit and receive data are the FILS STAs or the legacy STAs, the FILS AP 800 cannot determine whether to perform a procedure for the FILS. More specifically, the FILS AP requires information on whether the STA which transmits the probe request frame is the legacy STA or the FILS STA in order to determine whether to broadcast the probe response frame. Hereinafter, a method of transmitting information on the support for FILS of the STA to the AP is disclosed according to the embodiment of the present invention.

Hereinafter, for convenience of explanation, a description of the embodiment of the present invention starts from a step in which an FILS STA transmits a probe request frame. However, according to the embodiment of the present invention, if the probe request frame is received from a different STA, the FILS STA may determine whether to directly transmit the probe request frame.

For example, if a response of an AP for the probe request frame received from the different STA is equal to a response for information indicated by an MLME-SCAN.request primitive received by the FILS STA, the STA may not transmit the probe request frame. The AP may broadcast the probe response frame in response to the probe request frame transmitted by the different STA, and the STA may receive the broadcast probe response frame. In this manner, transmission for an additional probe request frame may be omitted.

Specifically, the STA may receive the probe request frame which is broadcast by the different STA. The STA may determine whether the probe request frame which is broadcast by the different STA is a probe request frame to be transmitted to an AP which intents to directly transmit the probe request frame. If the received probe request frame is not the probe request frame to be transmitted to the AP which intends to directly transmit the probe request frame, the STA may directly generate the probe request frame on the basis of the MLME-SCAN.request primitive.

Figure 9:
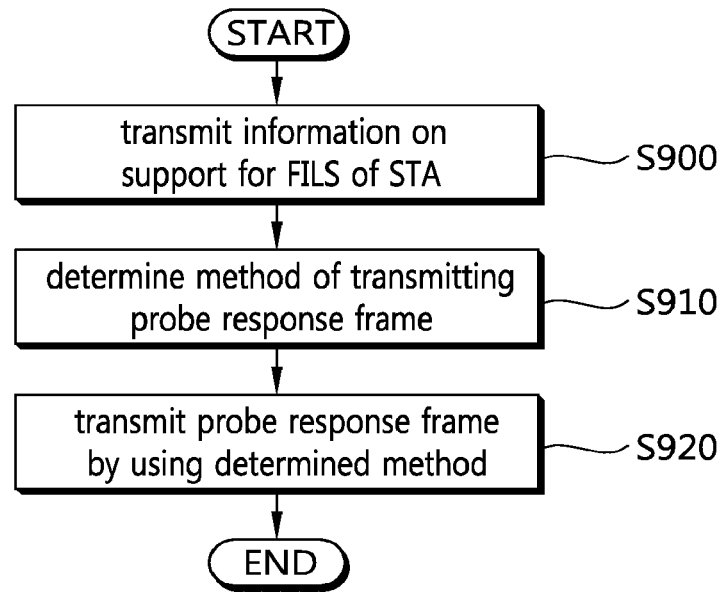
FIG. 9 shows the concept of an initial link setup procedure according to an embodiment of the present invention.

FIG. 9 shows the concept of an initial link setup procedure according to an embodiment of the present invention.

Referring to FIG. 9, an STA transmits information on the support for FILS to an FILS AP (step S900).

For example, the STA may transmit to the FILS AP a probe request frame by including an FILS capability element therein. The FILS capability element may include information for indicating whether the STA is an FILS STA supporting the FILS. In order to transmit the information on the support for FILS, the STA may transmit the information through a frame other than the probe request frame. The information on the support for FILS of the STA may be transmitted from the STA to the FILS AP by using other various information formats and various transmission methods.

The FILS AP determines a method of transmitting a probe response frame on the basis of the information on the support for FILS and received from the STA (step S910).

The FILS AP may determine the method of transmitting the probe response frame by determining whether at least one STA which transmits the probe request frame is a legacy STA.

As described above, if multiple probe request frames are received from multiple FILS STAs, the FILS AP may broadcast a probe response frame in response to the multiple probe request frames. According to an implementation, even if the probe request frame is received from one FILS STA, the FILS AP may broadcast the probe response frame in response to the probe request frame.

However, if at least one probe request frame is received from the legacy STA among the received multiple probe request frames, the FILS AP may unicast an additional probe response frame to the legacy STA.

For example, the FILS AP may determine whether a probe request frame received from the legacy STA exists among the received probe request frames on the basis of an FILS capability element included in the received probe request frame.

The FILS capability element may not exist among the received probe request frames, or the FILS capability element may exist in a probe request frame for indicating that the FILS is not supported by the STA. In this case, the FILS AP may unicast the probe response frame in response to the probe request frame which indicates that the FILS capability element does not exist or that the FILS is not supported by the STA. In addition, the FILS AP may broadcast the probe response frame in response to the remaining probe request frames in which the FILS capability element indicates that the STA supports the FILS.

For another example, the FILS capability element of all received probe request frames may indicate that the FILS is supported by the STA. In this case, the FILS AP may broadcast a probe response frame in response to the multiple probe request frames.

The FILS AP transmits the probe response frame by using a determined transmission method (step S920).

The FILS AP may transmit a probe response frame generated based on the transmission method determined in step S910.

Figure 10:
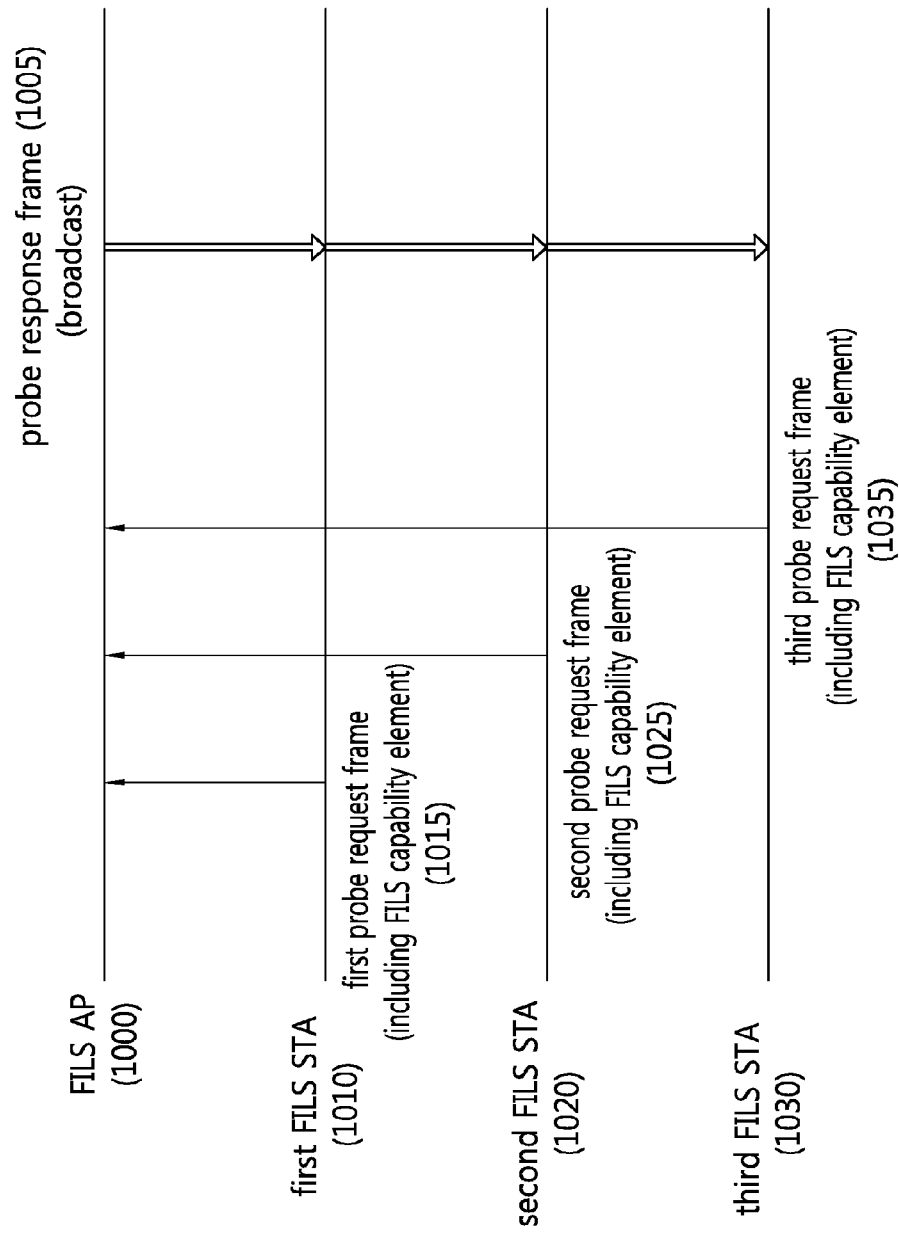
FIG. 10 shows the concept of a method of transmitting a probe response frame of a fast initial link setup (FILS) AP according to an embodiment of the present invention.
Figure 11:
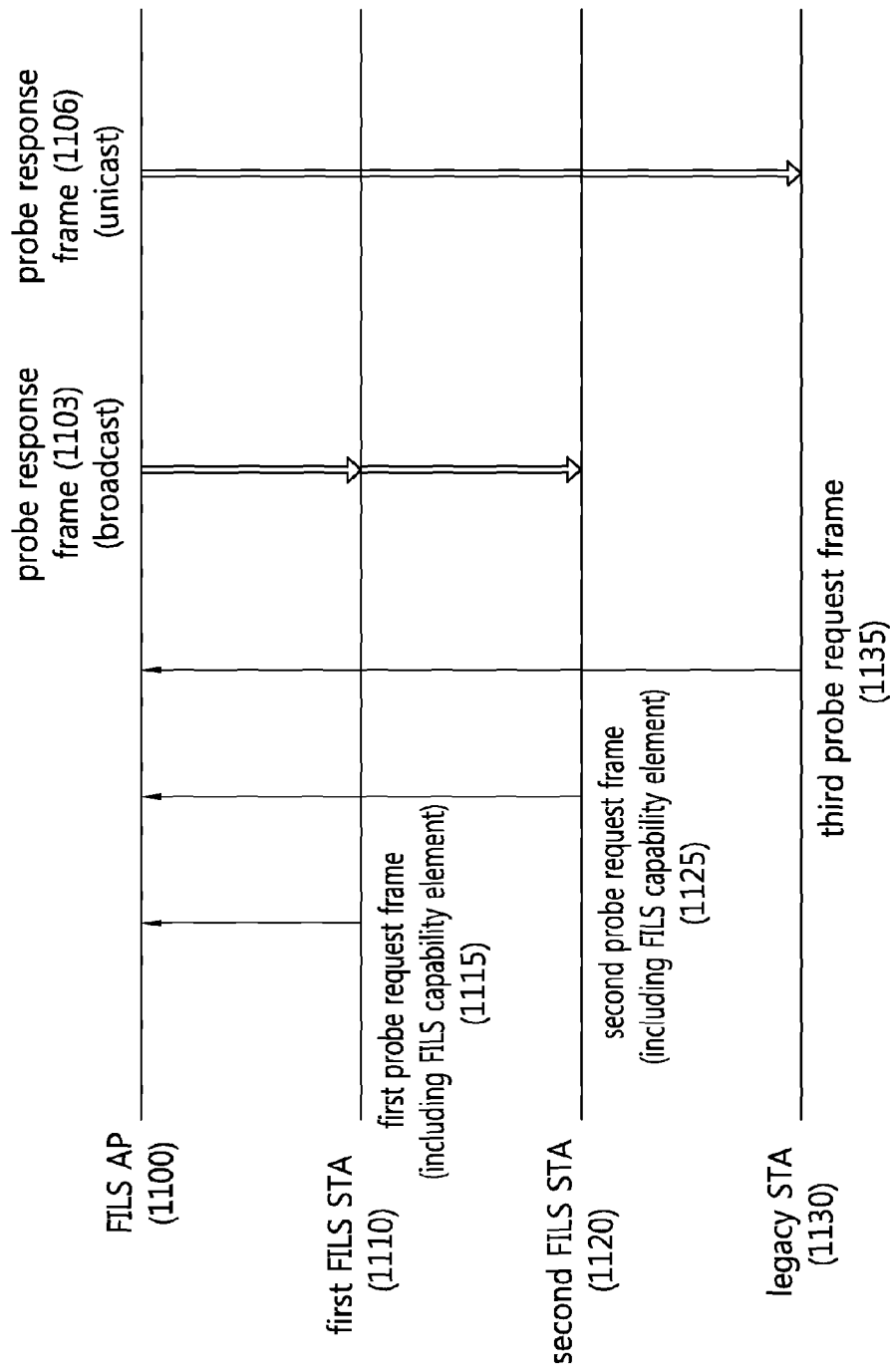
FIG. 11 shows the concept of a method of transmitting a probe response frame of an FILS AP according to an embodiment of the present invention.

In FIG. 10 and FIG. 11, it is disclosed a detailed operation of the FILS AP.

FIG. 10 shows the concept of a method of transmitting a probe response frame of an FILS AP according to an embodiment of the present invention.

A case where all multiple STAs which transmit the probe request frame support an FILS is assumed in FIG. 10. Although multiple FILS STAs are assumed in FIG. 10 for convenience of explanation, the procedure described below may also be applied between the FILS AP and the FILS STA even if one FILS STA is used.

Multiple FILS STAs 1010, 1020, and 1030 may transmit respective probe request frames 1015, 1025, and 1035 to an FILS AP 1000.

The probe request frames 1015, 1025, and 1035 transmitted respectively by the multiple FILS STAs 1010, 1020, and 1030 may include an FILS capability element, and the FILS capability element may indicate that the STA supports an FILS.

The FILS AP 1000 may acquire information indicating that all of the STAs 1010, 1020, and 1030 which transmit the probe request frame are FILS STAs on the basis of the FILS capability element included in the received multiple probe request frames 1015, 1025, and 1035. In this case, the FILS AP 1000 may broadcast a probe response frame 1005 to the multiple FILS STAs 1010, 1020, and 1030.

According to another embodiment of the present invention, the FILS AP 1000 may determine a method of transmitting the probe response frame 1005 by additionally determining whether individual request information exists in the received multiple probe request frames 1015, 1025, and 1035. For example, a specific probe request frame among the multiple probe request frames 1015, 1025, and 1035 received from the multiple FILS STAs 1010, 1020, and 1030 may include a requested element for requesting additional information through the probe response frame to be transmitted from the FILS AP 1000. In this case, in response to the specific probe request frame including the requested element, the FILS AP 1000 may unicast the probe response frame including the response for the requested element to the FILS STA which transmits the specific probe request frame. If the same information is requested by the remaining probe request frames other than the specific probe request frame including the requested element, the FILS AP 1000 may broadcast the same probe response frame to the multiple FILS STAs which transmit the remaining probe request frames.

In addition to the determination method based on the requested element, if the multiple probe request frames are received from the multiple FILS STAs, the FILS AP 1000 may additionally determine whether to broadcast or unicast the probe response frame to the multiple FILS STAs on the basis of other various determinations.

According to another embodiment of the present invention, even if the specific probe request frame including the requested element is received depending on an implementation, the FILS AP 1000 may broadcast a probe response frame including a response for the requested element to the multiple FILS STAs.

FIG. 11 shows the concept of a method of transmitting a probe response frame of an FILS AP according to an embodiment of the present invention.

A case where at least one STA among multiple STAs 1110, 1120, and 1130 which transmit a probe request frame is the legacy STA 1130 is assumed in FIG. 11. Although multiple FILS STAs are assumed in FIG. 11 for convenience of explanation, the procedure described below may also be applied between the FILS AP and the FILS STA even if one FILS STA is used.

Referring to FIG. 11, the multiple FILS STAs 1110 and 1120 and the legacy STA 1130 may transmit probe request frames 1115, 1125, and 1135 to an FILS AP 1100. Although it is assumed in FIG. 11 that one legacy STA exists for convenience of explanation, the legacy STA may also exist plural in number.

The probe request frames 1115 and 1125 transmitted by the respective FILS STAs 1110 and 1120 may include an FILS capability element. The FILS capability element may indicate that the STA supports an FILS.

The probe request frame 1135 transmitted by the legacy STA 1130 may not include the FILS capability element, or may include the FILS capability element but the included FILS may indicate that the FILS is not supported by the STA. Hereinafter, it is assumed in the embodiment of the present invention that the probe request frame 1135 transmitted by the legacy STA 1130 does not include the FILS capability element.

The FILS AP 1100 may acquire information indicating that the STAs 1110, 1120, and 1130 which transmit the multiple probe request frames 1115, 1125, and 1135 are the FILS STAs 1110 and 1120 and the legacy STA 1130 on the basis of whether the FILS capability element is included in the received multiple probe request frames 1115, 1125, and 1135. In this case, the FILS AP 1100 may broadcast a probe response frame 1103 to the multiple FILS STAs 1110 and 1120, and may unicast a probe response frame 1106 to the legacy STA 1130. By using this method, the legacy STA 1130 may perform an initial access by receiving the unicast probe response frame 1106 from the FILS AP 1100.

According to another embodiment of the present invention, the FILS AP 1100 may determine a method of transmitting the probe response frame by additionally determining whether individual request information exists in the multiple probe request frames received from the multiple FILS STAs. For example, a specific probe request frame among the multiple probe request frames received from the multiple FILS STAs may include a requested element for requesting additional information to the FILS AP 1100. In this case, in response to the specific probe request frame including the requested element, the FILS AP 1100 may unicast the probe response frame including the response for the requested element to the FILS STA which transmits the specific probe request frame. If the same information is requested by the remaining FILS STAs other than the specific FILS STA, the same probe response frame may be broadcast to the multiple FILS STAs.

In addition to the determination method based on the requested element, if the multiple probe request frames are received from the multiple FILS STAs, the FILS AP 1100 may additionally determine whether to broadcast or unicast the probe response frame to the multiple FILS STAs on the basis of other various determinations.

According to another embodiment of the present invention, even if the specific probe request frame including the requested element is received depending on an implementation, the FILS AP 1100 may broadcast a probe response frame including a response for the requested element to the multiple FILS STAs.

Figure 12:
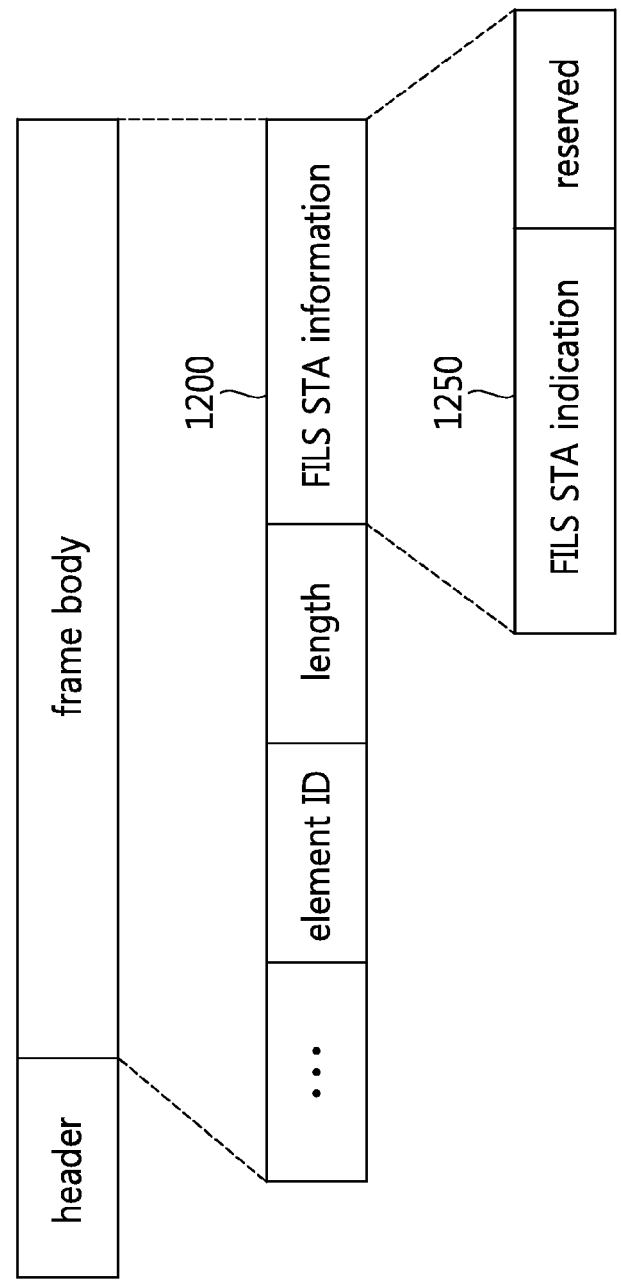
FIG. 12 shows the concept of a probe request frame according to an embodiment of the present invention.

FIG. 12 shows the concept of a probe request frame according to an embodiment of the present invention.

Referring to FIG. 12, a frame body of the probe request frame may include an FILS capability element.

The FILS capability element may include an element ID, a length, and FILS STA information 1200. The FILS STA information 1200 may include an FILS STA indication 1250 and a reserved bit.

The element ID may be used to indicate that a corresponding information element is the FILS capability element.

The length may include information on a length of the FILS STA information.

The FILS STA indication may indicate whether an STA supports an FILS. For example, if the FILS STA indication is 1, it may indicate that the STA supports the FILS, and if the FILS STA indication is 0, it may indicate that the STA does not support the FILS.

Such an information format is only one example, and other various methods may be used to transmit information on the support for FILS of the STA to the FILS AP.

Figure 13:
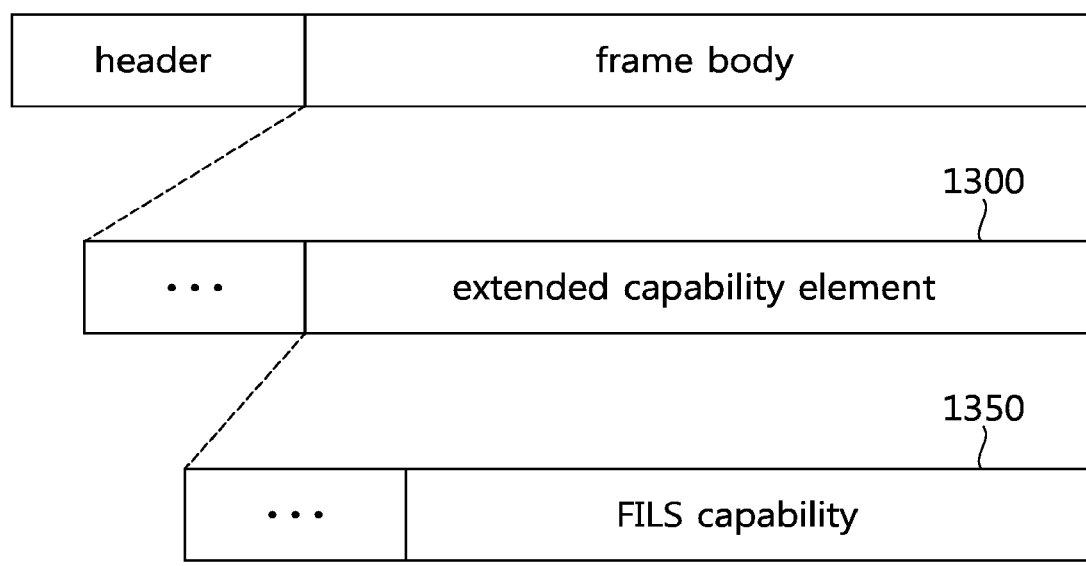
FIG. 13 shows the concept of a probe request frame according to an embodiment of the present invention.

FIG. 13 shows the concept of a probe request frame according to an embodiment of the present invention.

In FIG. 13, it is disclosed a method of delivering information on the support for FILS of STA on the basis of an extended capability element 1300.

According to the embodiment of the present invention, the extended capability element 1300 may be delivered by including FILS capability information 1350 as shown in Table 2 below. The extended capability element 1300 may be delivered by being included in a probe request frame, an authentication request frame, and an association request frame.

TABLE 2

| Bit | Information | Notes |
| --- | --- | --- |
| 48 | UTF-8 SSID | The SSID in this BSS is interpreted using UTF-8 encoding |
| 49 | FILS capability | When dot11fILSActivated is true, the FILS capability field is set to 1 to indicate the non-AP STA supporting the fast initial link setup |
| 50-n | Reserved | |

Referring to FIG. 13, the probe request frame may include the extended capability element 1300. The extended capability element 1300 may be an information element including information on a function that can be supported by the STA.

According to the embodiment of the present invention, the STA may deliver information on the support for FILS of the STA on the basis of the extended capability element 1300. More specifically, whether the STA supports the FILS may be transmitted by using the FILS capability information 1350 defined with a specific bit (e.g., 1 bit) in the extended capability element 1300. More specifically, if a value of the FILS capability information is 1, it may indicate that the STA supports the FILS.

The FILS AP may determine a method of transmitting the probe response frame on the basis of the FILS capability information included in the extended capability element of the received probe request frame.

Figure 14:
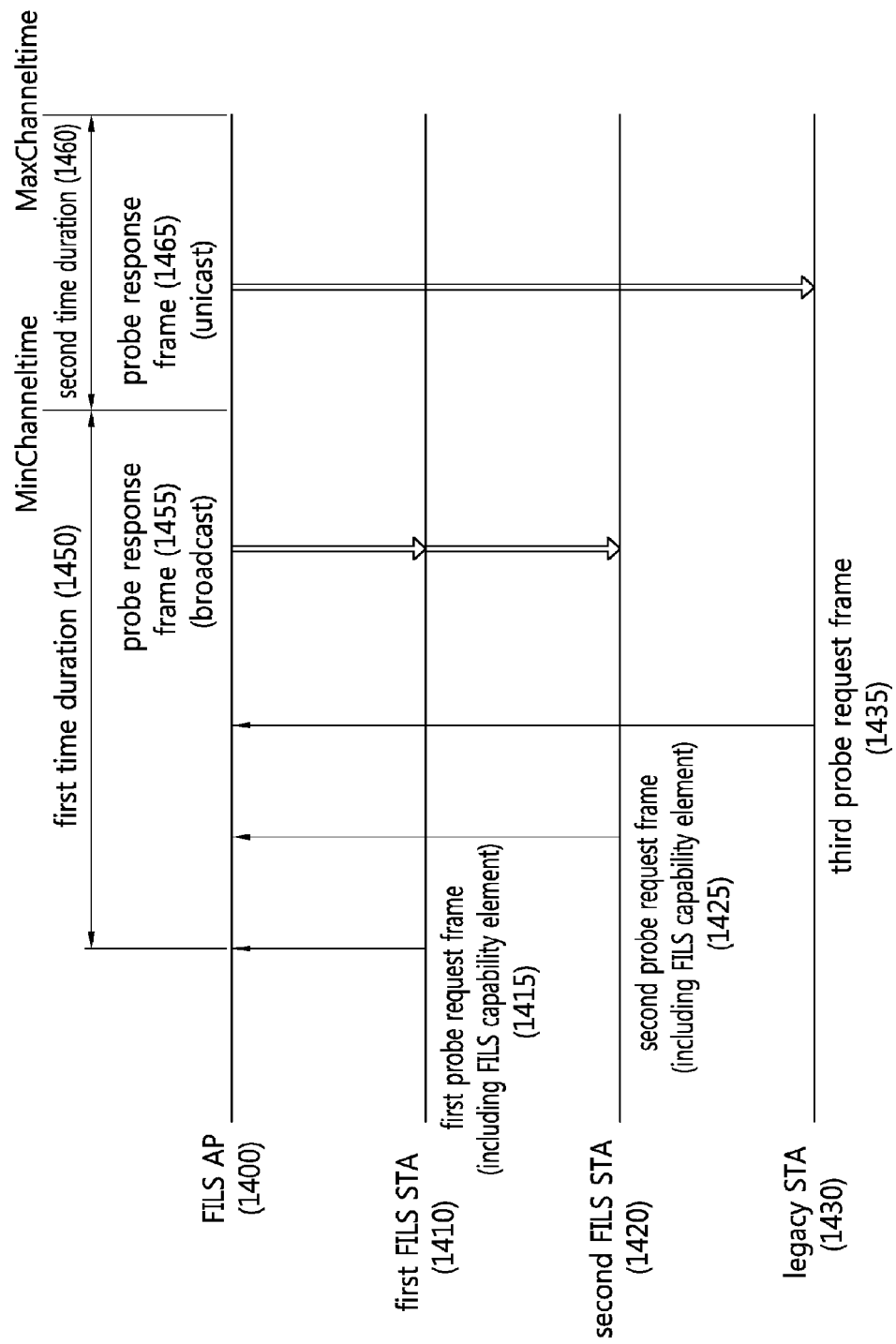
FIG. 14 shows the concept of a method of transmitting a probe response frame according to an embodiment of the present invention.

FIG. 14 shows the concept of a method of transmitting a probe response frame according to an embodiment of the present invention.

In FIG. 14, it is disclosed a method of transmitting a probe response frame to multiple FILS STAs 1410 and 1402 and at least one legacy STA 1430 if an FILS AP 1400 receives a probe request frame from the multiple FILS STAs 1410 and 1420 and the at least one legacy STA 1430. A case of using two FILS STAs and one legacy STA is assumed in FIG. 14. Although multiple FILS STAs are assumed in FIG. 14 for convenience of explanation, the procedure described below may also be applied between the FILS AP and the FILS STA even if one FILS STA is used.

Referring to FIG. 14, the FILS AP 1400 broadcasts a probe response frame 1455 to the multiple FILS STAs 1410 and 1420 in a first time duration 1450.

The FILS AP 1400 may broadcast the probe response frame 1455 preferentially to the multiple FILS STAs 1410 and 1420 in the first time duration 1450. The first time duration 1450 may be a time duration which is a part of a maximum channel time (MaxChannelTime) which is a maximum time in which the STA monitors a probe response frame in a specific channel.

According to the embodiment of the present invention, if a probe request frame is received from the multiple FILS STAs 1410 and 1420 and the at least one legacy STA 1430, the FILS AP 1400 may determine a specific duration within the MaxChannelTime as the first duration 1450 in which a probe response frame is broadcast to the FILS STA, and may determine the remaining durations as a second duration 1460 in which the probe response frame is unicast to the legacy STA.

For example, the duration in which a probe response frame 1455 is broadcast by the FILS AP 1400 may be a duration included in a minimum channel time (MinChannelTime). If the FILS AP 1400 broadcasts the probe response frame 1455 until the MinChannelTime, the legacy STA 1430 which monitors a probe response frame 1465 to be unicast may sense the probe response frame 1455 which is broadcast through a channel. As a result of sensing, a CCA.indication primitive may be discovered as being busy in the legacy STA 1430, and the legacy STA 1430 may monitor the probe response frame 1465 which is unicast from the FILS AP 1400 until a probe timer reaches the MaxChannelTime.

The FILS AP 1400 may broadcast the probe response frame to the legacy STA 1430 in the second time duration 1460.

The second time duration 1460 may correspond to a duration after the first time duration 1450 and before the MaxChannelTime. The MaxChannelTime may be a maximum duration in which the STA monitors the probe response frame with respect to a channel.

Unlike FIG. 14, the probe response frame may be transmitted from the FILS AP 1400 in a reverse order.

Figure 15:
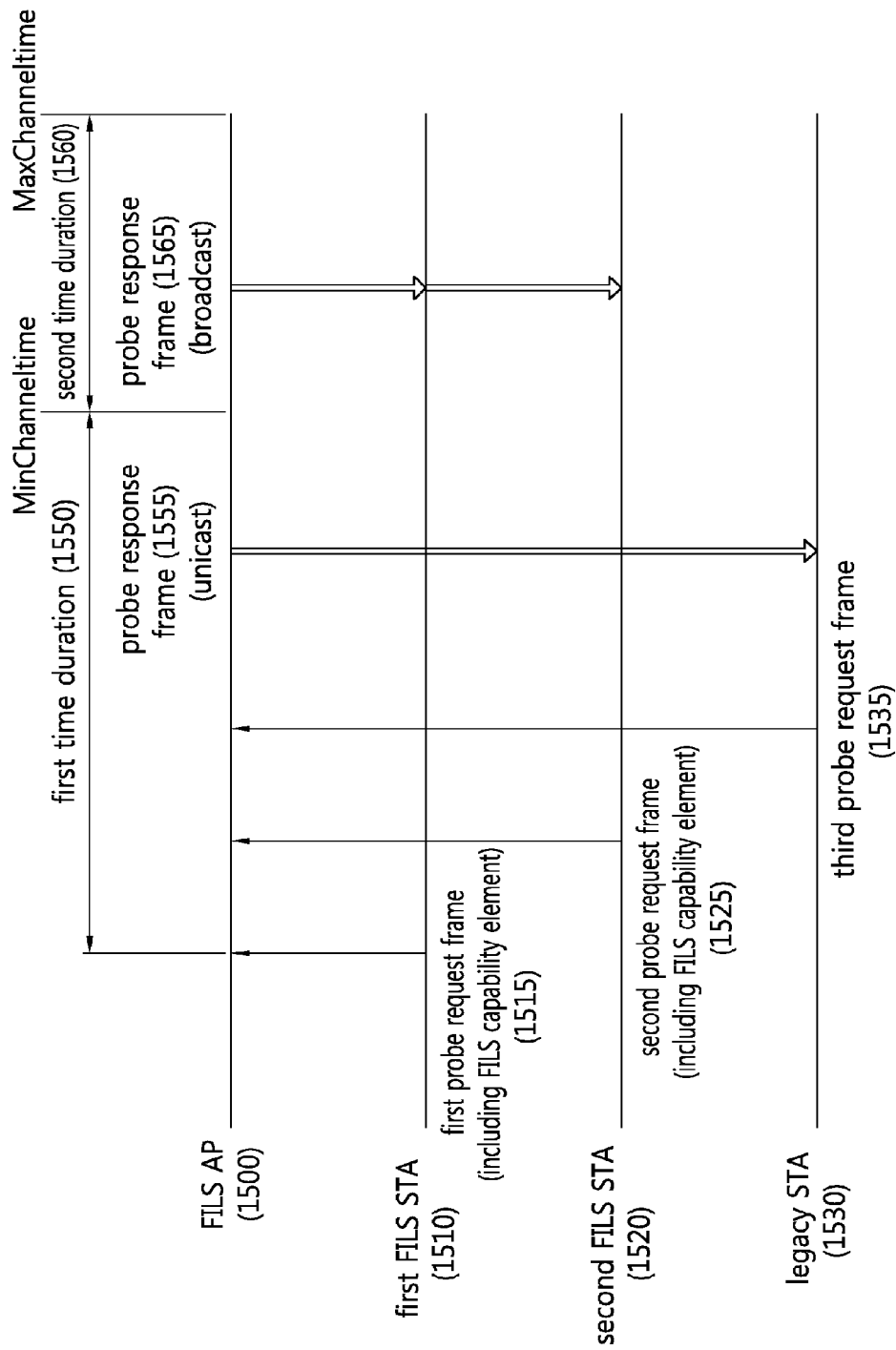
FIG. 15 shows the concept of a method of transmitting a probe response frame according to an embodiment of the present invention.

FIG. 15 shows the concept of a method of transmitting a probe response frame according to an embodiment of the present invention.

In FIG. 15, it is disclosed a method of transmitting a probe response frame to multiple FILS STAs 1510 and 1520 and at least one legacy STA 1530 if an FILS AP 1500 receives a probe request frame from the multiple FILS STAs 1510 and 1520 and the at least one legacy STA 1530. A case of using two FILS STAs and one legacy STA is assumed in FIG. 15. Although multiple FILS STAs are assumed in FIG. 15 for convenience of explanation, the procedure described below may also be applied between the FILS AP and the FILS STA even if one FILS STA is used.

Referring to FIG. 15, the FILS AP 1500 unicasts a probe response frame 1555 to the legacy STA 1530 in a first time duration 1550.

The FILS AP 1500 may unicast the probe response frame 1555 preferentially to the legacy STA 1530 in the first time duration 1550. The first time duration 1550 may be a time duration which is a part of a maximum channel time (MaxChannelTime) in which an STA scans a specific channel.

According to the embodiment of the present invention, if a probe request frame is received from the multiple FILS STAs and the at least one legacy STA, the FILS AP 1500 may determine a specific duration within the MaxChannelTime as a duration in which a probe response frame is unicast to the at least one legacy STA, and may determine the remaining durations as a duration in which the probe response frame is broadcast to the multiple FILS STAs.

For example, the duration in which the probe response frame 1555 is unicast by the FILS AP 1500 may be a duration corresponding to a minimum channel time (MinChannelTime). If the FILS AP 1500 unicasts the probe response frame 1555 until the MinChannelTime, the FILS STAs 1510 and 1502 which monitor the probe response frame to be broadcast may sense the probe response frame 1555 which is unicast through a channel. As a result of sensing, a CCA.indication primitive may be discovered as being busy in the FILS STAs 1510 and 1502, and the FILS STAs 1510 and 1502 may monitor a probe response frame 1565 which is broadcast from the FILS AP 1500 until a probe timer reaches the MaxChannelTime.

The FILS AP 1500 may broadcast the probe response frame 1565 to the FILS STAs 1510 and 1502 in the second time duration 1560.

The second time duration 1560 may correspond to a duration after the first time duration 1550 and before the MaxChannelTime. The MaxChannelTime may be a maximum duration in which the STA monitors the probe response frame with respect to a channel.

Figure 16:
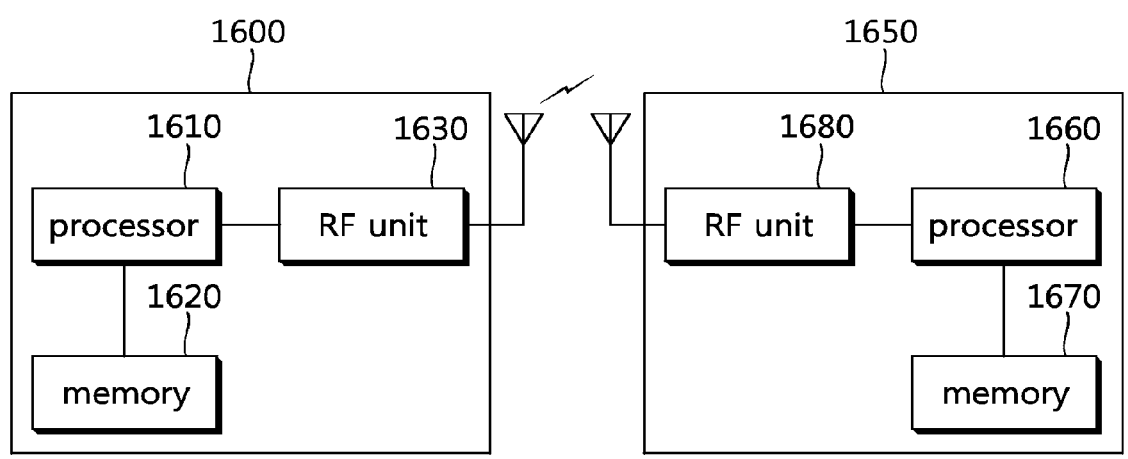
FIG. 16 is a block diagram showing a wireless device according to an embodiment of the present invention.

FIG. 16 is a block diagram illustrating a wireless device to which an embodiment of the present invention may apply.

Referring to FIG. 16, the wireless device 1600 may be an STA that may implement the above-described embodiments, and the wireless device 1600 may be an AP or a non-AP STA (station).

The AP 1600 includes a processor 1610, a memory 1620, and an RF (Radio Frequency) unit 1630.

The RF unit 1630 may be connected with the processor 1620 to transmit/receive radio signals.

The processor 1620 implements functions, processes, and/or methods as proposed herein. For example, the processor 1620 may be implemented to perform the operation of the above-described wireless device according to an embodiment of the present invention disclosed in FIG. 7 to FIG. 15.

For example, the processor 1620 may determine whether to broadcast or unicast the probe response frame on the basis of the probe request frame received from the STA. For example, the AP may determine whether the STA supports the FILS by using FILS capability information of the received probe request frame. As a result of the determination, the AP may broadcast the probe response frame in response to the probe request frame including the FILS capability information transmitted from the FILS STA. In addition, as the result of the determination, the AP may unicast the probe response message in response to a probe request frame not including FILS capability information transmitted from the legacy STA or a probe request frame in which the FILS capability information indicates that the STA does not support the FILS.

The STA 1650 includes a processor 1660, a memory 1670, and an RF (Radio Frequency) unit 1680.

The RF unit 1680 may be connected with the processor 1660 to transmit/receive radio signals.

The processor 1660 implements functions, processes, and/or methods as proposed herein. For example, the processor 1660 may be implemented to perform the operation of the above-described wireless device according to an embodiment of the present invention disclosed in FIG. 7 to FIG. 15.

For example, the processor 1660 may be configured to transmit a first probe request frame to an access point (AP), and to receive a probe response frame in response to the first probe request frame from the AP. The first probe request frame may include fast initial link setup (FILS) capability information, and the FILS capability information may indicate whether the first STA supports the FILS.

The processor 1610, 1660 may include an ASIC (Application-Specific Integrated Circuit), other chipset, a logic circuit, a data processing device, and/or a converter that performs conversion between a baseband signal and a radio signal. The memory 1620, 1640 may include a ROM (Read-Only Memory), a RAM (Random Access Memory), a flash memory, a memory card, a storage medium, and/or other storage device. The RF unit 1630, 1660 may include one or more antennas that transmit and/or receive radio signals.

When an embodiment is implemented in software, the above-described schemes may be embodied in modules (processes, or functions, etc.) performing the above-described functions. The modules may be stored in the memory 1620, 1640 and may be executed by the processor 1610, 1660. The memory 1620, 1640 may be positioned in or outside the processor 1610, 1660 and may be connected with the processor 1610, 1660 via various well-known means.

What is claimed is:

1. A method of performing active scanning in a wireless local area network (WLAN), the method comprising:
transmitting by a station (STA) a first probe request frame to an access point (AP); and
receiving by the STA a probe response frame from the AP in response to the first probe request frame,
wherein the first probe request frame includes fast initial link setup (FILS) capability information,
wherein the probe response frame is based on a broadcast transmission when the FILS capability information indicates that the STA supports the FILS,
wherein the probe response frame is based on a unicast transmission to the STA when the FILS capability information does not indicate that the STA supports the FILS, and
wherein the FILS capability information is included in an extended capability element of the first probe request frame.

2. The method of claim 1, further comprising:
receiving by the STA a second probe request frame on a broadcast transmission from a different STA; and
determining by the STA whether the second probe request frame is transmitted to the AP,
wherein the first probe request frame is transmitted when the STA determines that the second probe request frame is not transmitted to the AP.

3. The method of claim 2,
wherein the extended capability element includes information on STA capability.

4. A station (STA) for performing active scanning in a wireless local area network (WLAN), the STA comprising:
transmitter and a receiver; and
a processor, operatively coupled to the transmitter and receiver, that:
controls the transmitter to transmit a first probe request frame to an access point (AP), and
controls the receiver to receive a probe response frame from the AP in response to the first probe request frame,
wherein the first probe request frame includes fast initial link setup (FILS) capability information,
wherein the probe response frame is based on a broadcast transmission when the FILS capability information indicates that the STA supports the FILS,
wherein the probe response frame is based on a unicast transmission to the STA when the FILS capability information does not indicate that the STA supports the FILS, and
wherein the FILS capability information is included in an extended capability element of the first probe request frame.

5. The STA of claim 4,
wherein the processor further:
controls the receiver to receive a second probe request frame on a broadcast transmission from a different STA, and
determines whether the second probe request frame is transmitted to the AP,
wherein the first probe request frame is transmitted when the processor determines that the second probe request frame is not transmitted to the AP.

6. The STA of claim 5, wherein the extended capability element includes information on STA capability.

* * * * *